US006885676B2

(12) United States Patent
Ebina et al.

(10) Patent No.: US 6,885,676 B2
(45) Date of Patent: Apr. 26, 2005

(54) BROADCASTING CONTROL SYSTEM AND METHOD IN ATM RING NETWORK

(75) Inventors: Kazuo Ebina, Tokyo (JP); Toshiyuki Abe, Miyagi (JP)

(73) Assignee: NEC Corporation (JP)

( * ) Notice: Subject to any disclaimer, the term of this patent is extended or adjusted under 35 U.S.C. 154(b) by 803 days.

(21) Appl. No.: 09/731,280

(22) Filed: Dec. 6, 2000

(65) Prior Publication Data

US 2001/0003525 A1 Jun. 14, 2001

(30) Foreign Application Priority Data

Dec. 8, 1999 (JP) .......................................... 11-348266

(51) Int. Cl.$^7$ .............................................. H04L 12/66
(52) U.S. Cl. .................... 370/452; 370/450; 370/395.1; 370/258
(58) Field of Search ................................ 370/452, 450, 370/403, 395.1, 258, 395.2, 395.3, 449, 451, 461, 462

(56) References Cited

U.S. PATENT DOCUMENTS

| | | | | |
|---|---|---|---|---|
| 5,617,419 A | * | 4/1997 | Christensen et al. | ........ 370/471 |
| 5,636,215 A | * | 6/1997 | Kubo et al. | .................. 370/397 |
| 6,104,714 A | * | 8/2000 | Baudelot et al. | ............ 370/396 |
| 6,216,166 B1 | * | 4/2001 | Zheng et al. | ............... 709/238 |

FOREIGN PATENT DOCUMENTS

| | | |
|---|---|---|
| JP | 59-100652 | 6/1984 |
| JP | 60-097753 | 5/1985 |
| JP | 1-12031 | 6/1989 |
| JP | 1-144741 | 6/1989 |
| JP | 8-023342 | 1/1996 |
| JP | 9-205450 | 8/1997 |

OTHER PUBLICATIONS

Japanese Office Acted issued Aug. 13, 2002 (w/ English translation of relevant portions).

* cited by examiner

Primary Examiner—Steven Nguyen
Assistant Examiner—Thien D Tran
(74) Attorney, Agent, or Firm—Dickstein, Shapiro, Morin & Oshinsky, LLP

(57) ABSTRACT

In a broadcasting control system in an ATM ring network in which a control cell containing control information is transmitted by ATM (Asynchronous Transfer Mode) between a plurality of nodes connected into a ring shape, each of the nodes includes a receiving section and a transmitting section. The receiving section receives a control cell from an upstream node. The transmitting section writes response information of the self node for the control information contained in the received control cell in an area corresponding to the self node in the control cell and transmits the control cell to a downstream node. A broadcasting control method is also disclosed.

12 Claims, 4 Drawing Sheets

BROADCASTING CONTROL SYSTEM AND METHOD IN ATM RING NETWORK

BACKGROUND OF THE INVENTION

The present invention relates to a broadcasting control system and broadcasting control method in an ATM (Asynchronous Transfer Mode) ring network.

Conventionally, in an ATM ring network system, a plurality of nodes (#1 to #n) 2-1 to 2-n are connected into a ring shape, as shown in FIG. 4. In this arrangement, when a control user cell (to be referred to as a cell hereinafter) B is sent from the node 2-1, each of the nodes 2-2 to 2-n generates one response cell C in response to the cell B, so the number of response cells C increases toward the downstream.

Each of the above-described response cells C has a No (identification data) C1 of itself, e.g., a node No or VPI (Virtual Path Identifier) value in the payload, as shown in FIG. 6. The node 2-1 as a parent control node confirms the response states of the nodes 2-2 to 2-n on the basis of response data C2 in the payload.

FIG. 5 shows each of the nodes 2-1 to 2-n. Referring to FIG. 5, each of the nodes 2-2 to 2-n comprises an ATM switch (ATM SW) 21, a user cell receiving section 22 for receiving a cell branched from the ATM switch 21, a user cell transmitting section 23 for transmitting a cell through the ATM switch 21, and an MPU (Micro Processing Unit) 24 for transmitting response data to the user cell transmitting section 23 on the basis of control data output from the user cell receiving section 22. Reference numeral 201 denotes an upstream transmission line; and 202, a downstream transmission line.

When an ATM cell containing control data is broadcast from the node 2-1 for control, the ATM switch 21 in each of the nodes 2-2 to 2-n branches a cell. In addition, in each of the nodes 2-2 to 2-n, an ATM cell containing response data generated by the user cell transmitting section 23 is sent to the node 2-1 through the ATM switch 21.

In the above-described conventional ATM ring network system, since n-1 response cells C as shown in FIG. 6 are almost simultaneously generated for one broadcasting from a node, the user cell receiving section of each node is required to have high processing performance. For this reason, the ATM ring network system itself becomes uneconomical.

For example, the ITU recommendations I.630 are defined for ATM switching as recommendations for a 1:1 system. However, a 1:n system is a subject for future examination and has not been standardized yet.

SUMMARY OF THE INVENTION

It is an object of the present invention to provide a broadcasting control system and method in an ATM ring network, which can build an economical system.

In order to achieve the above object, according to the present invention, there is provided a broadcasting control system in an ATM ring network in which a control cell containing control information is transmitted by ATM (Asynchronous Transfer Mode) between a plurality of nodes connected into a ring shape, each of the nodes comprising receiving means for receiving a control cell from an upstream node, and transmitting means for writing response information of the self node for the control information contained in the received control cell in an area corresponding to the self node in the control cell and transmitting the control cell to a downstream node.

DESCRIPTION OF THE PREFERRED EMBODIMENT

The present invention will be described below in detail with reference to the accompanying drawings.

Figure 1:
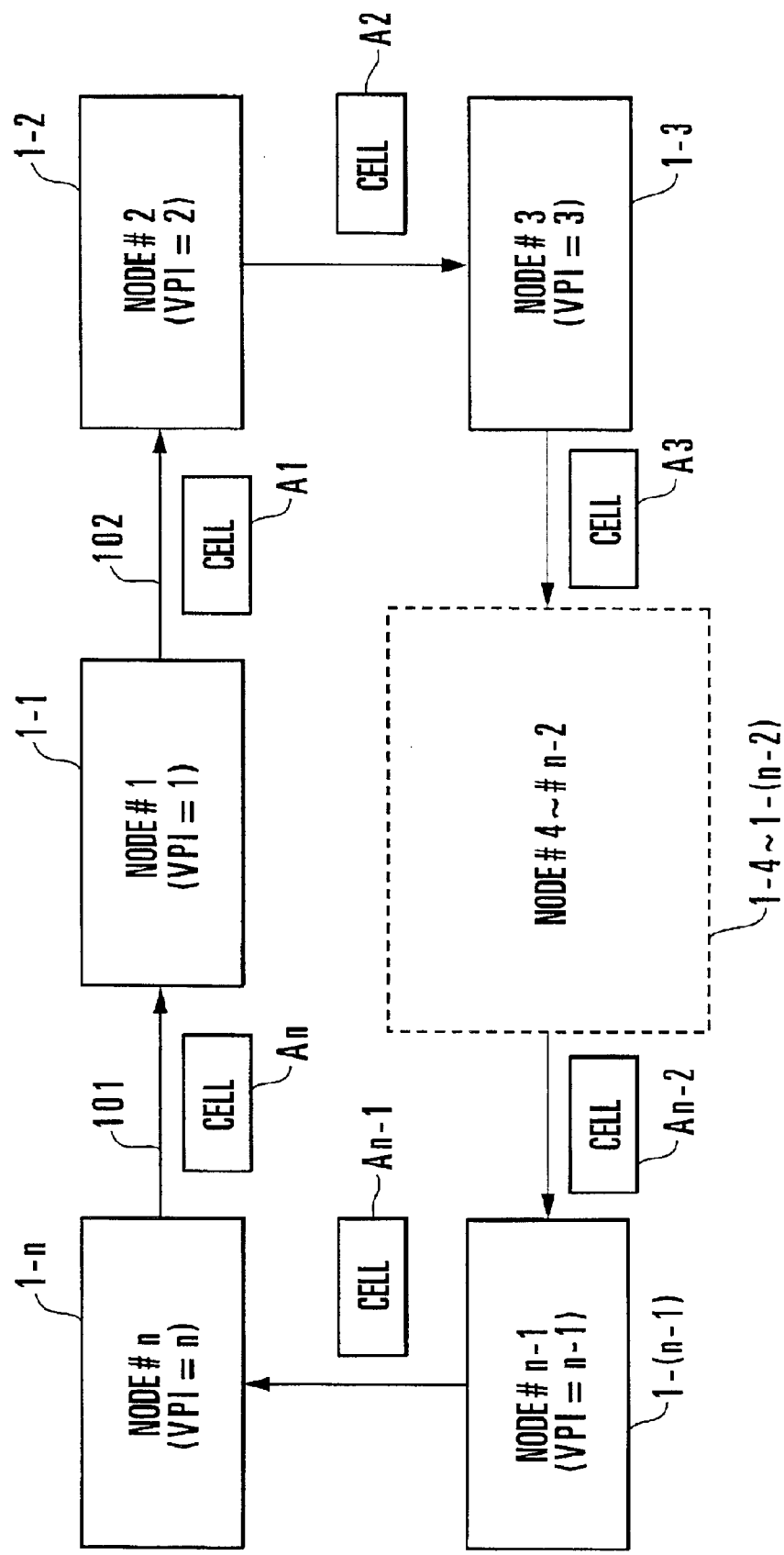
FIG. 1 is a block diagram showing an ATM ring network system according to an embodiment of the present invention.

FIG. 1 shows an ATM ring network system according to an embodiment of the present invention. Referring to FIG. 1, the ATM ring network system of this embodiment has a plurality of nodes (#1 to #n) 1-1 to 1-n connected into a ring shape. For the descriptive convenience, the nodes 1-1 to 1-n are assigned VPI values 1 to n, respectively. Upstream and downstream transmission lines 101 and 102 are connected to the nodes 1-1 to 1-n.

A control user cell (to be referred to as a cell hereinafter) A1 sent from the node 1-1 is input to the node 1-2 through the downstream transmission line 102. The node 1-2 rewrites a data portion related to itself in the received cell A1 to response data and sends a rewritten cell A2 to the downstream node 1-3.

Upon receiving the cell A2, the node 1-3 rewrites the response data and sends the rewritten cell A3 to the downstream. Subsequently, the nodes 1-4 to 1-n repeat the same operation as described above, and finally, a cell An is sent from the node 1-n to the node 1-1. Thus, all data in the cell A1 are rewritten to response data (cells A2 to An) by the nodes 1-2 to 1-n and finally terminated at the node 1-1 and the response data are detected.

Figure 2:
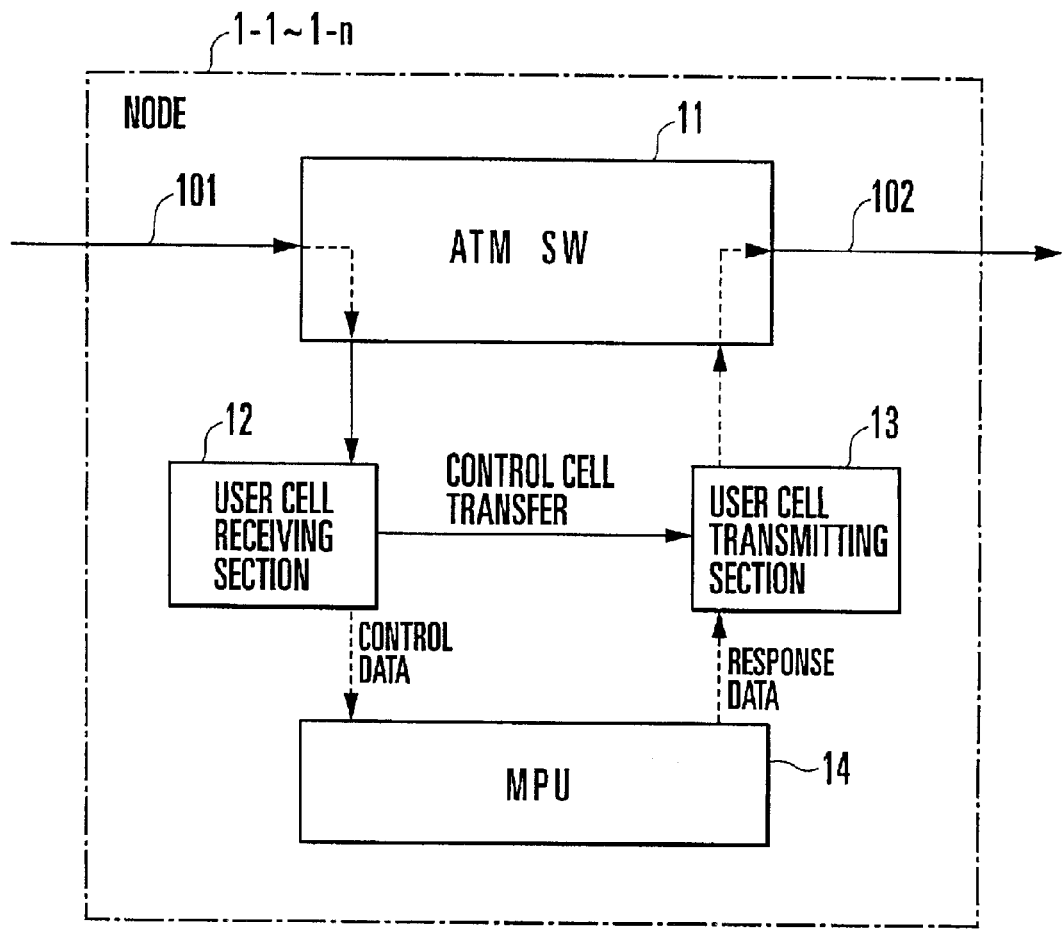
FIG. 2 is a block diagram showing each of nodes shown in FIG. 1.

FIG. 2 shows each of nodes 1-1 to 1-n shown in FIG. 1. Referring to FIG. 2, each of the nodes 1-1 to 1-n comprises an ATM switch (ATM SW) 11 for terminating a cell input from the upstream transmission line 101, a user cell receiving section 12 for receiving and transferring the cell terminated by the ATM switch 11, a user cell transmitting section 13 for outputting a response cell to the downstream transmission line 102 through the ATM switch 11 in response to the cell transferred from the user cell receiving section 12, and an line control MPU 14 for receiving control data output from the user cell receiving section 12 and outputting response data to the user cell transmitting section 13.

Figure 3:
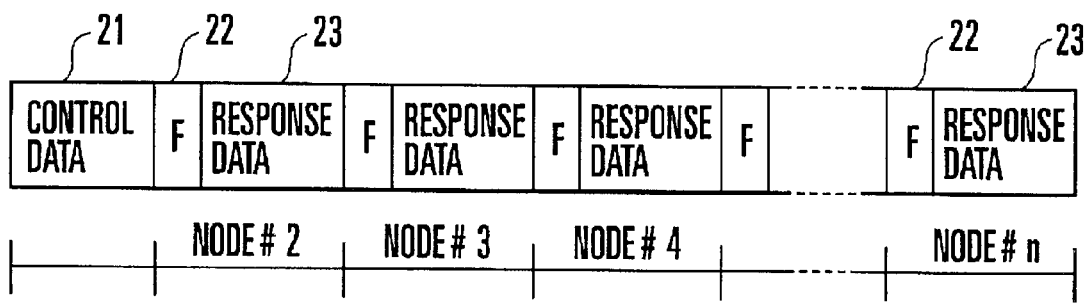
FIG. 3 is a view showing the structure of a control user cell shown in FIG. 1.
Figure 4:
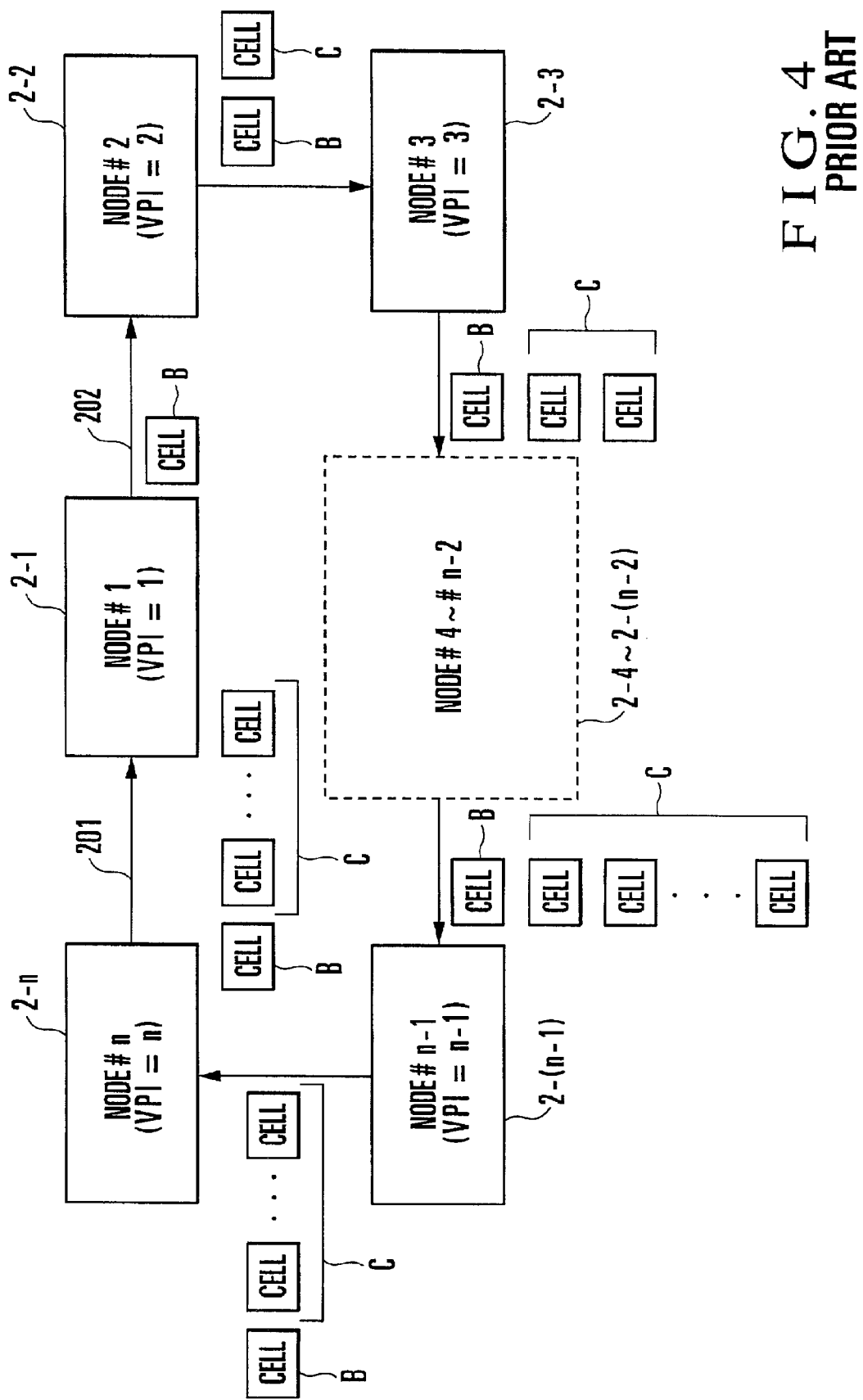
FIG. 4 is a block diagram showing a conventional ATM ring network system.
Figure 5:
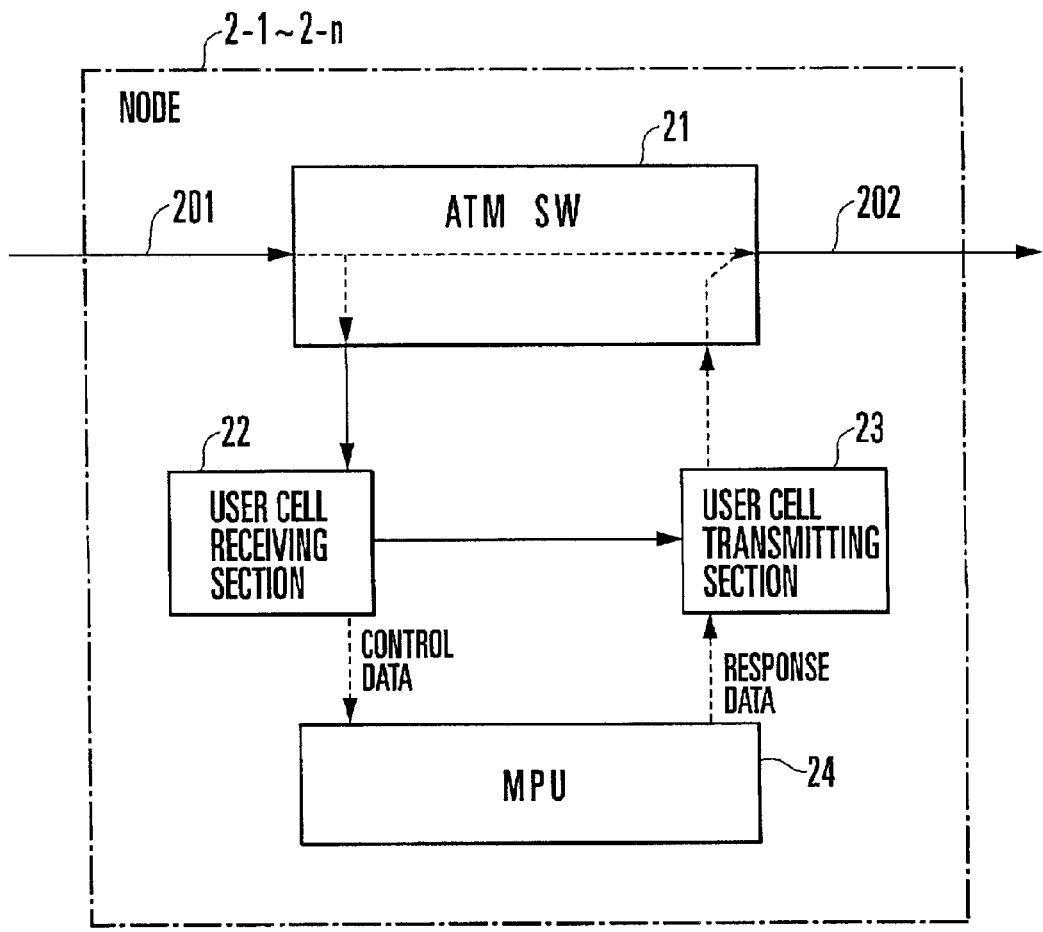
FIG. 5 is a block diagram showing each of nodes shown in FIG. 4.
Figure 6:
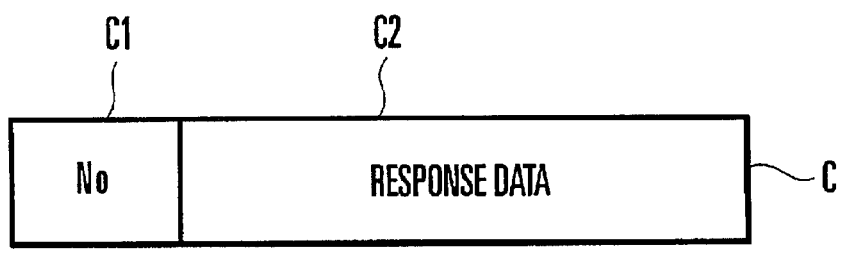
FIG. 6 is a view showing the structure of a response cell shown in FIG. 4.

FIG. 3 shows the structure of the above-described cells A1 to An. Referring to FIG. 3, the cells A1 to An comprise a broadcasting control data portion 21, a plurality of flags (F) 22 representing the end of reception in units of nodes, and a plurality of response message portions 23 corresponding to the nodes. The cells A1 to An contain the flags 22 and response message portions 23 in number equal to the number n-1 of control target nodes.

The operation of the above-described ATM ring network system will be described next. For the 1-bit flag 22, "0" represents control, and "1" represents response.

For control by broadcasting, control data is generated by the user cell receiving section 12 of the node 1-1 and output to the user cell transmitting section 13 through the MPU 14. The user cell transmitting section 13 writes the control data from the MPU 14 to the broadcasting control data portion 21 to assemble the cell A1, and outputs the assembled cell A1 to the downstream transmission line 102 through the ATM switch 11. Thus, the cell A1 is transferred to the node 1-2 through the downstream transmission line 102. At this time, all the flags 22 have logic "0".

The cell A1 received by the node 1-2 is received by the user cell receiving section 12 through the ATM switch 11. The user cell receiving section 12 of the node 1-2 outputs the control data written in the broadcasting control data portion 21 of the received cell A to the MPU 14 and directly transfers the received cell A1 to the user cell transmitting section 13.

In the node 1-2, the MPU 14 executes control in the device in accordance with the received control data and outputs the control result to the user cell transmitting section 13 as response data. The user cell transmitting section 13 rewrites the flag 22 corresponding to its own VPI value to "1" and rewrites the response message portion 23 to the response data received from the MPU 14, thereby generating the cell A2. After that, the cell A2 is transferred to the node 1-3 as a downstream device through the ATM switch 11.

The above processing operation is sequentially repeatedly executed by the nodes 1-3 to 1-n until the node 1-1 receives the cell An from the node 1-n.

In the node 1-1, the cell An from the node 1-n through the upstream transmission line 101 is received by the user cell receiving section 12 through the ATM switch 11, and the contents of the flags 22 and response message portions 23 corresponding to the nodes 1-2 to 1-n, respectively, in the cell An are confirmed.

According to this embodiment, only one kind of control user cell A need be detected and generated independently of the number of control target nodes. Hence, the number of nodes of a constructable network is irrelevant to the performance of the ATM cell disassemble/generation function, and an economical system can be built. That is, as compared to the conventional case wherein response cells are individually generated and transferred to the control source by the nodes, the dependence on the performance of the ATM cell disassemble/generation function is small and an economical control function can be realized. Note that the present invention can also be applied as an alarm polling scheme.

As has been described above, according to the present invention, in an ATM ring network system in which an ATM user cell is transmitted between a plurality of nodes connected into a ring shape in an asynchronous transfer mode, when each of the plurality of nodes is to operate the remaining nodes in accordance with control information, a control cell containing the control information is transmitted to the remaining nodes by broadcasting, and upon receiving the control cell containing the control information from another node, a portion of the control cell, which corresponds to the self station, is rewritten to the response contents of the self station, and the cell is transmitted to the downstream, thereby building an economical system.

What is claimed is:

1. A broadcasting control system in an ATM ring network in which a control cell containing control information is transmitted by ATM (Asynchronous Transfer Mode) between a plurality of nodes connected into a ring shape, each of the nodes comprising: receiving means for receiving a control cell from an upstream node; and transmitting means for writing response information of the self node for the control information contained in the received control cell in an area corresponding to the self node in the control cell and transmitting the control cell to a downstream node.

2. A broadcasting control system in an ATM ring network in which a control cell containing control information is transmitted by ATM (Asynchronous Transfer Mode) between a plurality of nodes connected into a ring shape, each of the nodes comprising: receiving means for receiving a control cell from an upstream node; and transmitting means for writing response information of the self node for the control information contained in the received control cell in an area corresponding to the self node in the control cell and transmitting the control cell to a downstream node, wherein the control cell contains the control information, and a plurality of pieces of response information and flag information for the respective nodes.

3. The system according to claim 2, wherein said transmitting means transmits the control cell to which the response information of the self node responding to the control information and flag information representing response of the self node are attached.

4. The system according to claim 1, wherein a value of a virtual path identifier is preset for each node.

5. The system according to claim 1, wherein in a control information transmission source node, said transmitting means transmits the control cell containing control information to the modes except the transmission source node by broadcasting.

6. A broadcasting control system in an ATM ring network in which a control cell containing control information is transmitted by ATM (Asynchronous Transfer Mode) between a plurality of nodes connected into a ring shape, each of the nodes comprising: receiving means for receiving a control cell from an upstream node; and transmitting means for writing response information of the self node for the control information contained in the received control cell in an area corresponding to the self node in the control cell and transmitting the control cell to a downstream node, wherein said system further comprises processing control means for outputting to said transmitting means a processing control result according to control data from said receiving means as response information, said receiving means outputs the control data contained in the received control cell to said processing control means and transfers the received control cell to said transmitting means, and said transmitting means writes the response information from said processing control means in the area corresponding to the self node in the control cell from said receiving means and transmits the control cell.

7. A broadcasting control system in an ATM ring network in which a control cell containing control information is transmitted by ATM (Asynchronous Transfer Mode) between a plurality of nodes connected into a ring shape, each of the nodes comprising: receiving means for receiving a control cell containing control information from an upstream node, the control cell having a first area where the control information is written before transmission of the control cell, and a plurality of second areas provided in correspondence with the respective nodes, where response information for the control information is written during control cell transmission; and transmitting means for writing, in the second area, response information of the self node for the control information in the first area, and transmitting the control cell containing the control information and the pieces of response information of the respective nodes to a downstream node.

8. The system according to claim 7, wherein the control cell has a plurality of third areas, provided in correspondence with the respective nodes, where flag information representing that the response information has been written in the second area is written.

9. A broadcasting control method in an ATM ring network in which a control cell containing control information is transmitted by ATM (Asynchronous Transfer Mode) between a plurality of nodes connected into a ring shape, comprising the steps of: transmitting a control cell from a control information transmission source node to the remaining nodes except the transmission source node; and in each of the nodes except the transmission source node, writing response information of the self node for the control information contained in the received control cell in an area corresponding to the self node in the control cell and repeatedly transmitting the control cell to a downstream node.

10. The method according to claim 9, wherein the control cell contains the control information, and a plurality of pieces of response information and flag information for the respective nodes.

11. The method according to claim 10, wherein the transmitting step comprises the step of attaching the response information of the self node responding to the control information and flag information representing response of the self node to the control cell and transmitting the control cell.

12. The method according to claim 9, wherein a value of a virtual path identifier is preset for each node.

* * * * *